(12) United States Patent
Gabrielsson et al.

(10) Patent No.: US 11,478,731 B2
(45) Date of Patent: Oct. 25, 2022

(54) FILTER SEGMENT WITH A LIGHT WEIGHT FRAME

(71) Applicants: Karl Gabrielsson, Saltsjö-Boo (SE); Tony Bjorkenius, Vendelso (SE); Gregory Gilmore, Nashua, NH (US)

(72) Inventors: Karl Gabrielsson, Saltsjö-Boo (SE); Tony Bjorkenius, Vendelso (SE); Gregory Gilmore, Nashua, NH (US)

(73) Assignee: Valmet Technologies Oy, Espoo (FI)

( * ) Notice: Subject to any disclaimer, the term of this patent is extended or adjusted under 35 U.S.C. 154(b) by 681 days.

(21) Appl. No.: 15/916,761

(22) Filed: Mar. 9, 2018

(65) Prior Publication Data

US 2018/0214800 A1    Aug. 2, 2018

Related U.S. Application Data

(63) Continuation-in-part of application No. 14/241,624, filed as application No. PCT/US2012/052410 on Aug. 25, 2012, now Pat. No. 9,968,875.

(60) Provisional application No. 61/528,386, filed on Aug. 29, 2011.

(51) Int. Cl.
| B01D 33/23 | (2006.01) |
| D21G 9/00 | (2006.01) |
| D21D 5/04 | (2006.01) |

(52) U.S. Cl.
CPC .............. *B01D 33/23* (2013.01); *D21D 5/04* (2013.01); *D21G 9/00* (2013.01); *B01D 2201/127* (2013.01)

(58) Field of Classification Search
CPC combination set(s) only.
See application file for complete search history.

(56) References Cited

U.S. PATENT DOCUMENTS

| 4,077,887 A | * | 3/1978 | Langvik | ................ | B01D 33/23 |
| | | | | | 210/331 |
| 4,622,137 A | * | 11/1986 | Kessler | ................ | B01D 29/668 |
| | | | | | 210/167.13 |
| 9,968,875 B2 | * | 5/2018 | Gabrielsson | ........... | B01D 35/28 |

* cited by examiner

*Primary Examiner* — Patrick Orme
(74) *Attorney, Agent, or Firm* — James Earl Lowe, Jr.

(57) ABSTRACT

A disc segment adapted to be attached to other disc segments to form a disc assembly, the disc segment being in the form of a frame, the frame comprising a left side rail and a right side rail, and a plurality of spaced apart parallel horizontally extending ribs, each disc side including a corrugated wire mesh supported by the frame ribs, the corrugated wire mesh including crisscrossing wire strands, the strands crossing perpendicularly to each other, and the wire strands extend at an angle of 45 degrees relative to its frame rib.

2 Claims, 11 Drawing Sheets

FILTER SEGMENT WITH A LIGHT WEIGHT FRAME

This application claims and cites benefit to U.S. Pat. No. 9,968,875 and is a 35 U.S.C. 371 application from PCT/US12/52410 and incorporates features therefrom.

TECHNICAL FIELD

This disclosure relates to a disc assembly used as a filter in a processing operation, and, more particularly, to improvements thereto.

BACKGROUND

The disc assembly according to this disclosure may be utilized in connection with any liquid medium, comprising various liquids, suspensions, etc. containing constituents desired to be filtered away, but it is especially beneficial when used to dewater fiber suspensions, especially cellulose fibers.

Although disc assemblies used for this purpose are well known, their construction is heavy and hard to manufacture.

It is desirable to have a disc assembly made of a lighter material, easy to manufacture and assemble.

Technical Solution

A disc segment adapted to be attached to other disc segments to form a disc assembly, the disc segment including an isosceles trapezoid frame. The frame comprises a left side rail and a right side rail, and a plurality of spaced apart parallel horizontally extending ribs connected between the side rails. The frame defines a first disc side and an opposite second disc side, each disc side including a corrugated left bottom clamp list adjacent the left side rail and supported by the ribs, and a corrugated right bottom clamp list adjacent the right side rail and supported by the ribs. Each disc side also includes a corrugated wire mesh supported by the left and right clamp lists, and supported by the frame ribs.

A left corrugated top clamp list is adjacent the left side rail and attached to the frame, sandwiching the wire mesh between the left bottom clamp list and the left top clamp list, and a right corrugated top clamp list is adjacent the right side rail and attached to the frame, sandwiching the wire mesh between the right bottom clamp list and the right top clamp list.

Advantageous Effects

This disc segment is lighter than conventional disc segments, and easier to manufacture.

Before one embodiment of the disclosure is explained in detail, it is to be understood that the disclosure is not limited in its application to the details of the construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward" and "downward", etc., are words of convenience and are not to be construed as limiting terms.

More particularly, throughout this description and claims, a disc segment is described as including left and right. In alternate embodiments, the sides can be reversed. For example, the left side may be on the right, and the right side may be on the left, and so on. The description and claims also refer to top and bottom, which is dependent on the orientation. Top and bottom as used herein mean that in some possible orientations of the disc segment, one element is below or above another.

BEST MODE

As illustrated in the drawings, this disclosure provides a disc assembly 20 (see FIG. 1) including a plurality of disc segments 24 attached to one another to form a disc, and a central hub 26. Such disc assemblies are most often used as filters in a pulp processing operation, such as the one disclosed in Vore U.S. Pat. No. 3,331,512; which is incorporated herein by reference. 2

Figure 2:
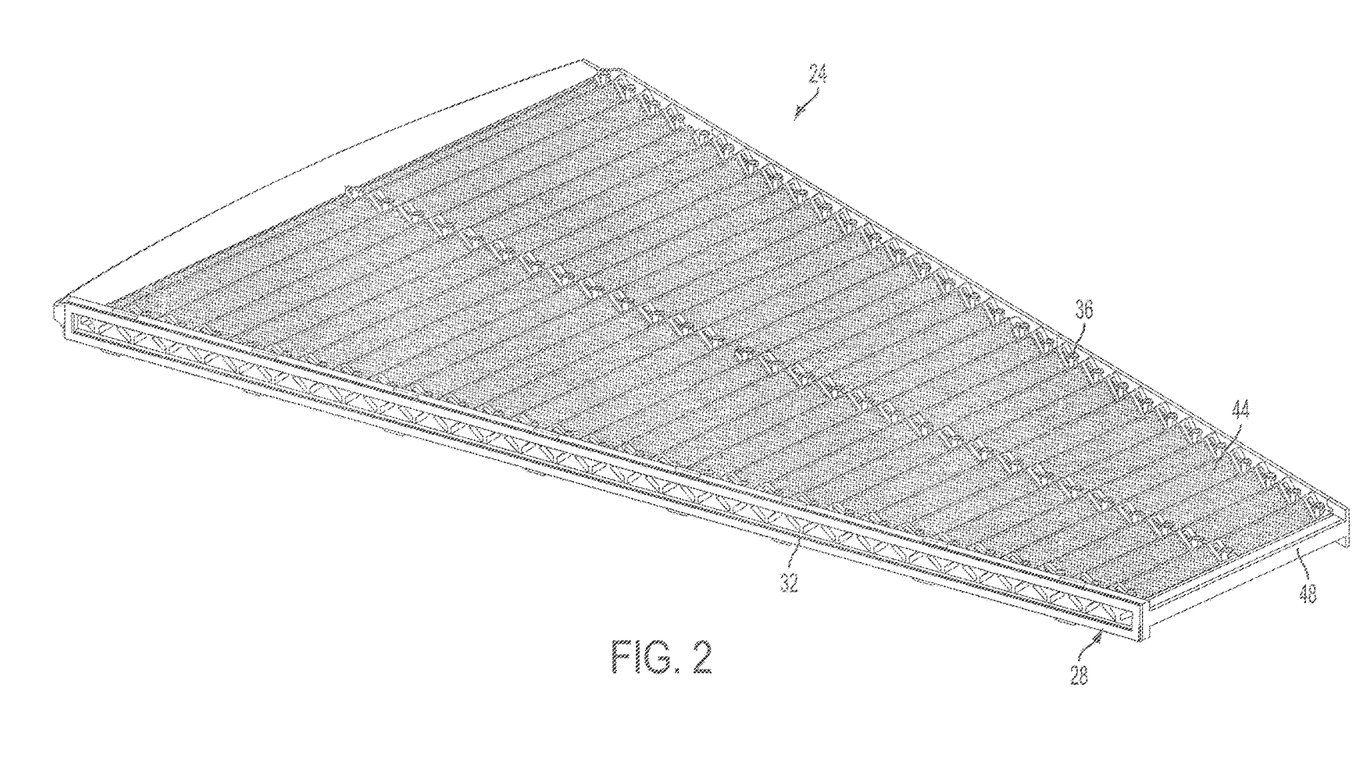
FIG. 2 is a perspective view of an assembled disc segment according to this disclosure.
Figure 3:
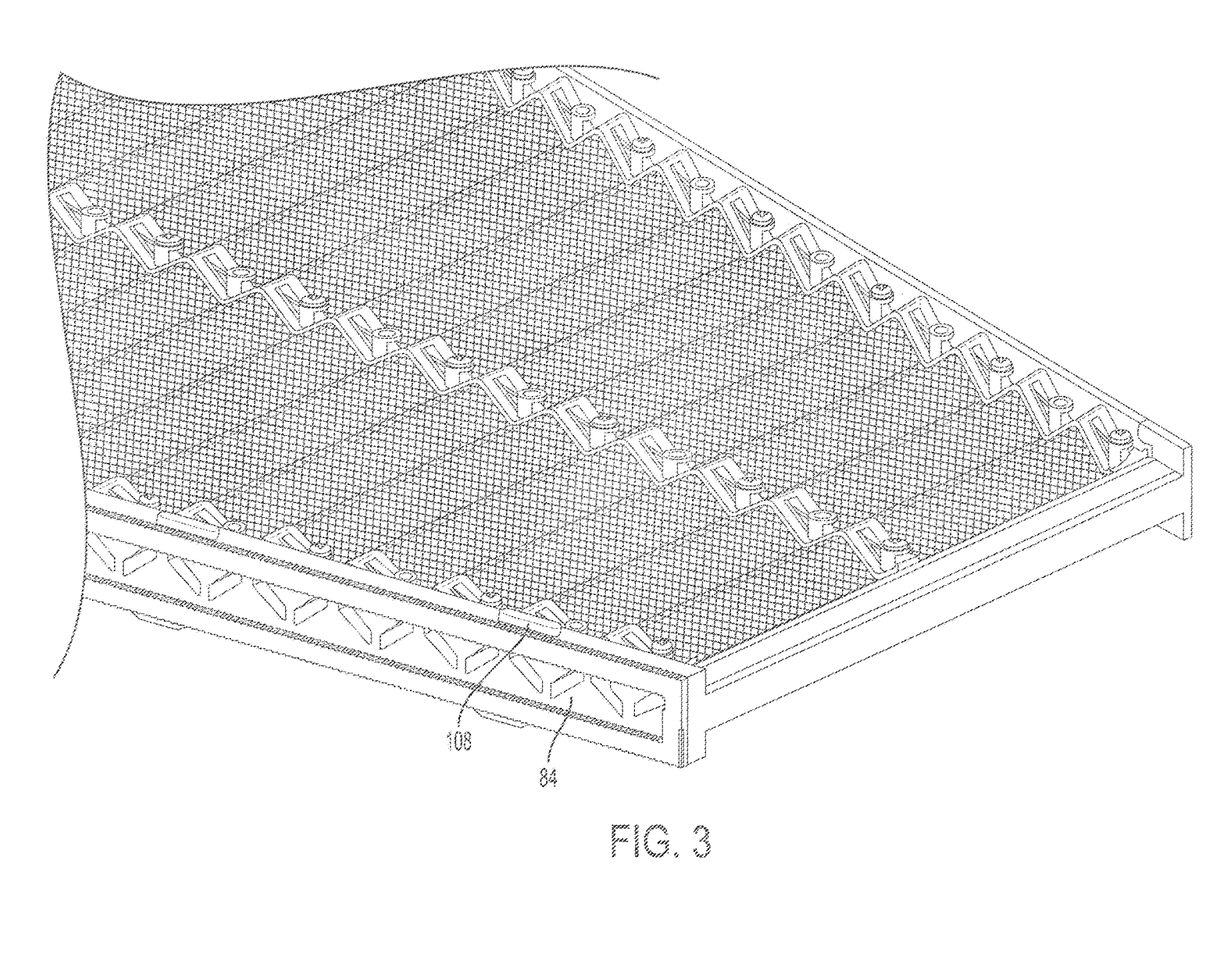
FIG. 3 is an enlarged view of the bottom end of the disc segment shown in FIG. 2.
Figure 4:
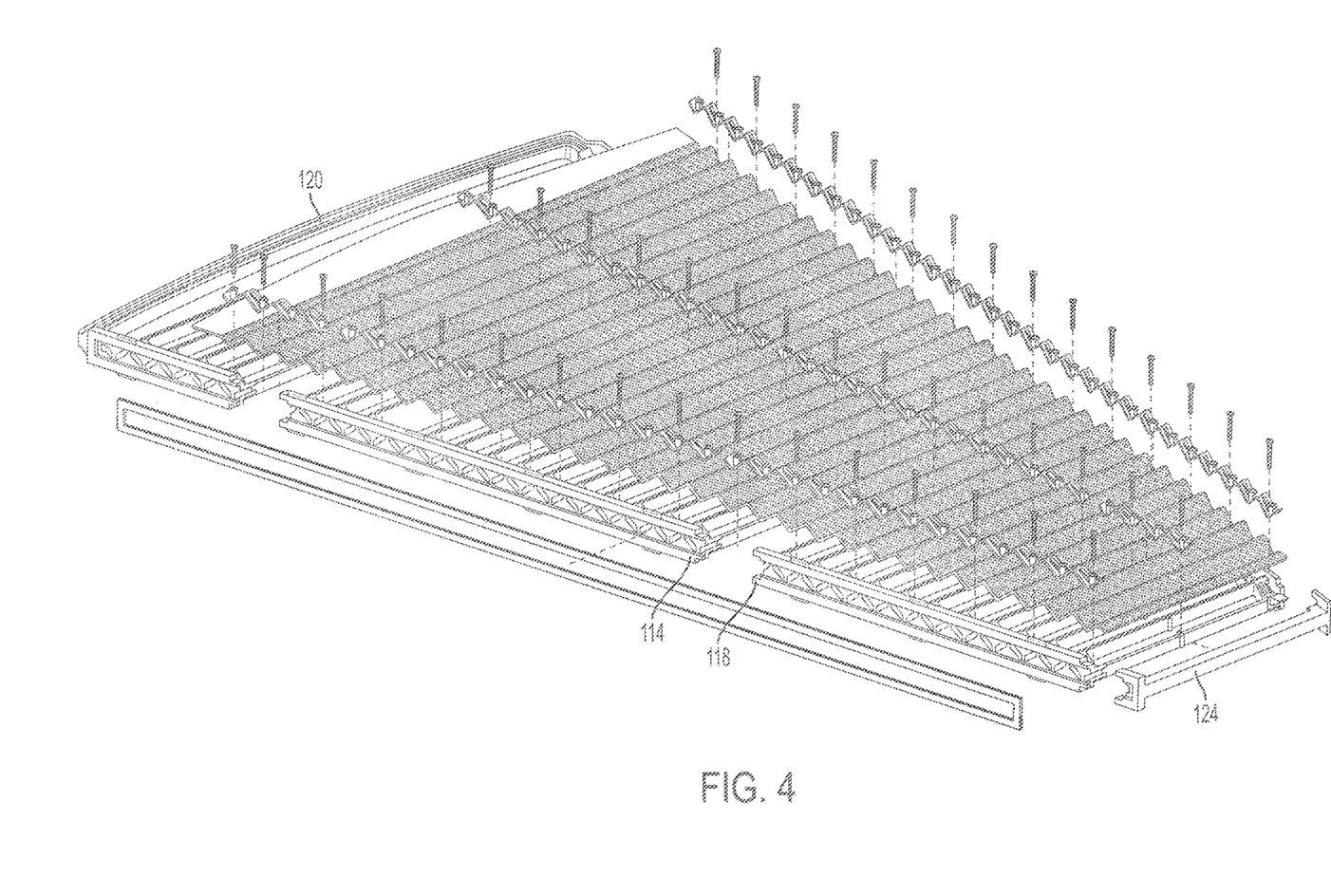
FIG. 4 is an exploded perspective view of the disc segment of FIG. 2, with only one 1 side of the disc segment being shown, the opposite side having been removed to simplify this illustration.
Figure 5:
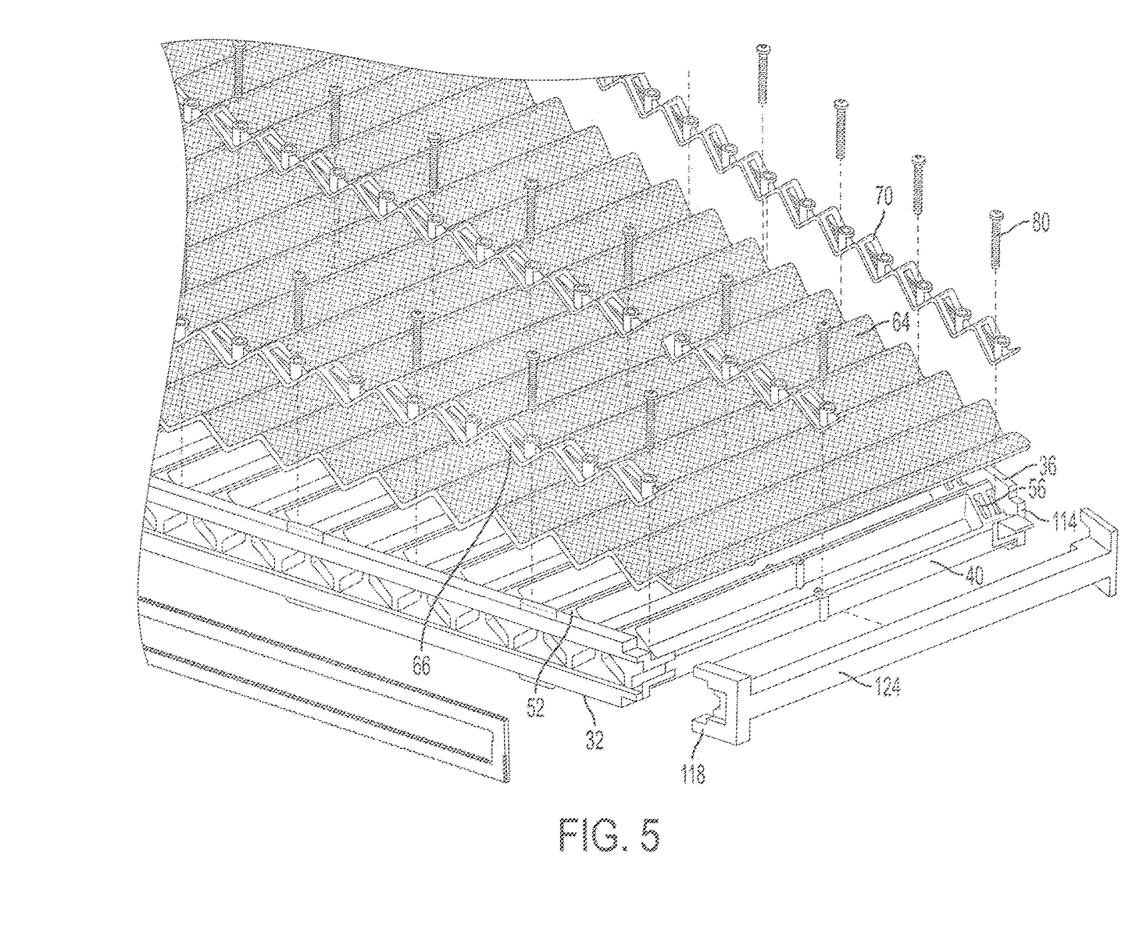
FIG. 5 is an enlarged view of the bottom end of the disc segment shown in FIG. 4.
Figure 6:
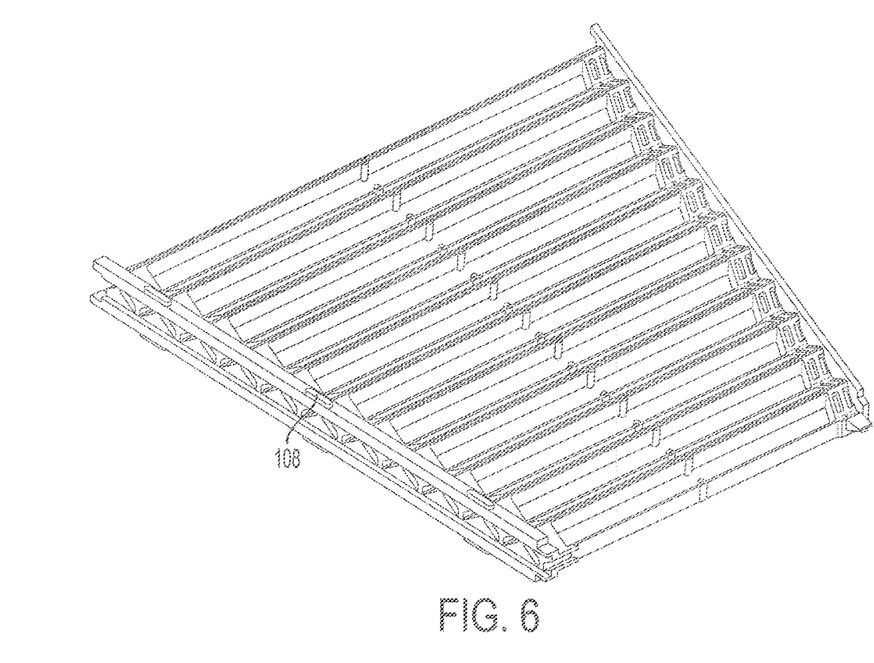
FIG. 6 is a perspective view of a frame according to this disclosure.

Each disc segment 24, as shown in FIGS. 3 and 5, includes an isosceles trapezoid frame 28, the frame 28 comprising a left side rail 32 and a right side rail 36, and a plurality of spaced apart parallel horizontally extending ribs 40 connected between the side rails. The frame 28, as shown in FIG. 2, defines a first disc side 44 and an opposite second disc side 48. As shown in FIGS. 4, 5 and 6, each disc side includes a corrugated left bottom clamp list 52 adjacent the left side rail 32 and supported by the ribs 40, and a corrugated right bottom clamp list 56 adjacent the right side rail 36 and supported by the ribs 40.

As illustrated in FIG. 5, a corrugated wire mesh 64 is supported by the left, central and right clamp lists, and supported by the frame ribs. A left corrugated top clamp list 66 is placed adjacent the left side rail 32, and preferably over the left corrugated bottom clamp list 52, and then attached to the frame 28, sandwiching the wire mesh 64 between the left bottom clamp list 52 and the left top clamp list 66. In a similar fashion, a right corrugated top clamp list 70 is placed adjacent the right side rail 36 and attached to the frame 28, sandwiching the wire mesh 64 between the right bottom clamp list 56 and the right top clamp list 70. A corrugated central top clamp list 74 is also placed over the wire mesh 64, and attached to the frame 28.

Figure 10:
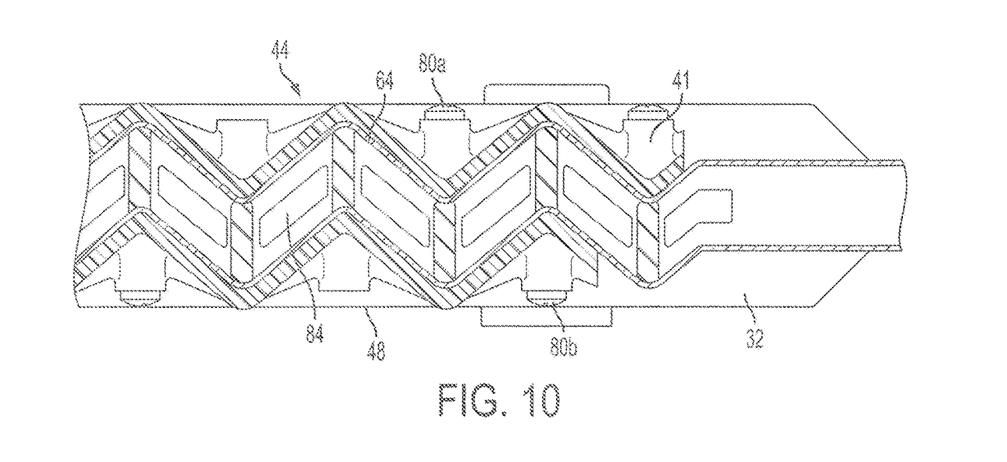
FIG. 10 is a cross sectional view of the disc segment taken along the line 10 #10 in FIG. 9.

A plurality of spaced apart screws 80 attaches the clamp lists to the frame 28. In the preferred embodiment, the screws 80 are self-taping screws, but in other embodiments, other means for securing the lists to the ribs, can be used. Further, in the preferred embodiment, as illustrated in FIG. 10, a first screw 80a on a first disc side 44 is attached to a rib 40, and a second screw 80b on the second disc side 48 is attached to the rib 40 spaced apart from the first screw 80a, thus staggering along the length of the frame the screw locations along one side and the other of the disc segment, as shown in FIG. 10. In order to enhance the ability of the screws 80 to be attached to the ribs 40, cylindrical seats 41 are formed in the ribs 40, and receive the screws 80.

The respective clamp lists space the first disc side wire mesh from the second disc side wire mesh, forming an open area 84 between the ribs 40. Filtrate passing though the wire mesh 64 is able to travel along the ribs 40 and between the clamp lists to the left side rail 32.

Figure 1:
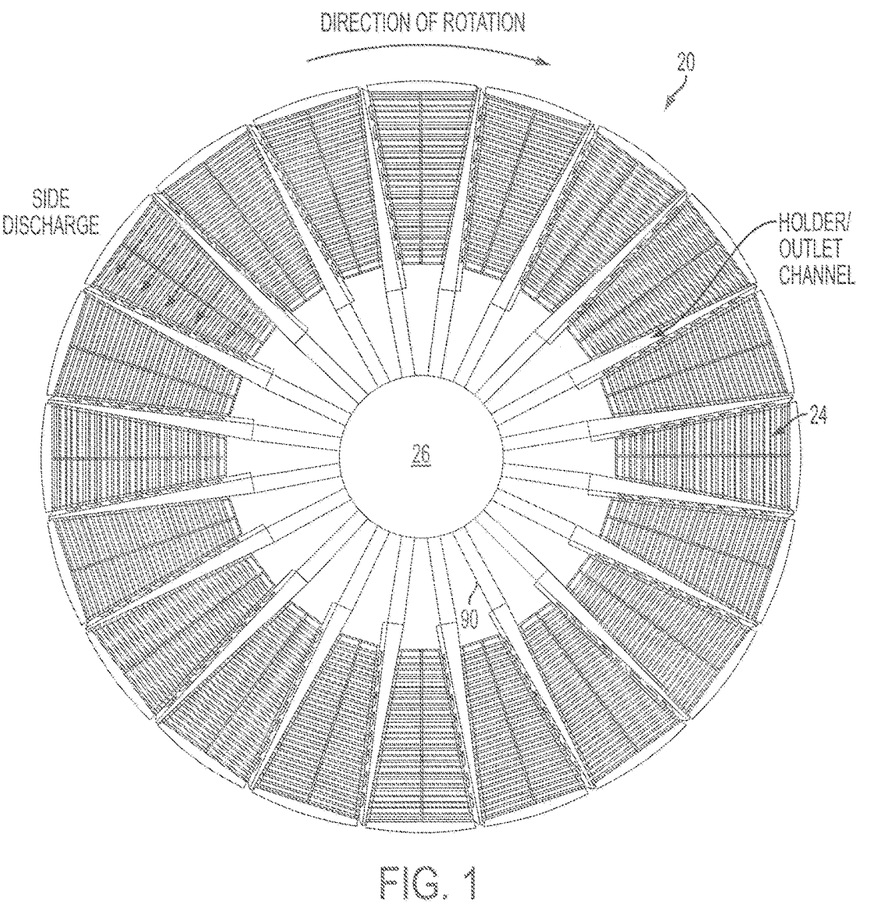
FIG. 1 is a side view of a disc assembly according to this disclosure.
Figure 7:
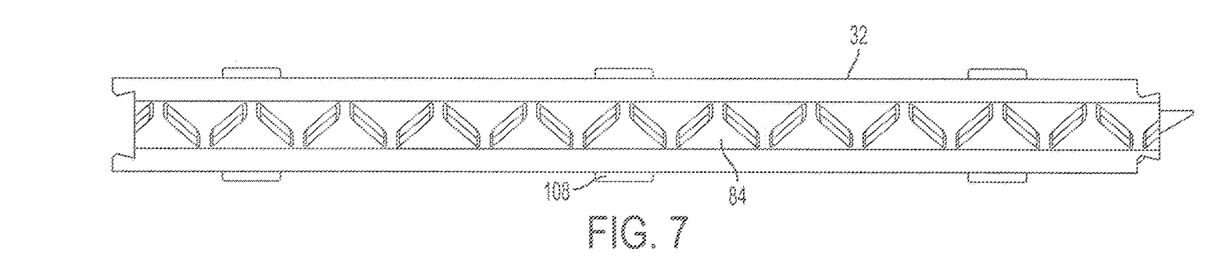
FIG. 7 is a side view of the left side rail of the frame shown in FIG. 6.
Figure 8:
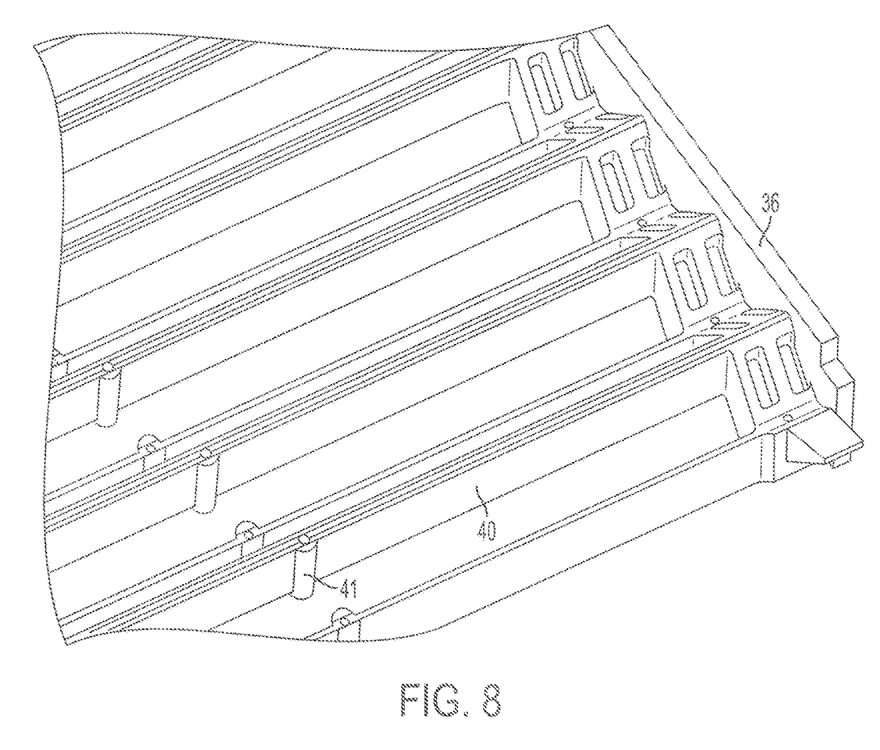
FIG. 8 is an enlarged view of the bottom right end of the frame shown in FIG. 7.
Figure 9:
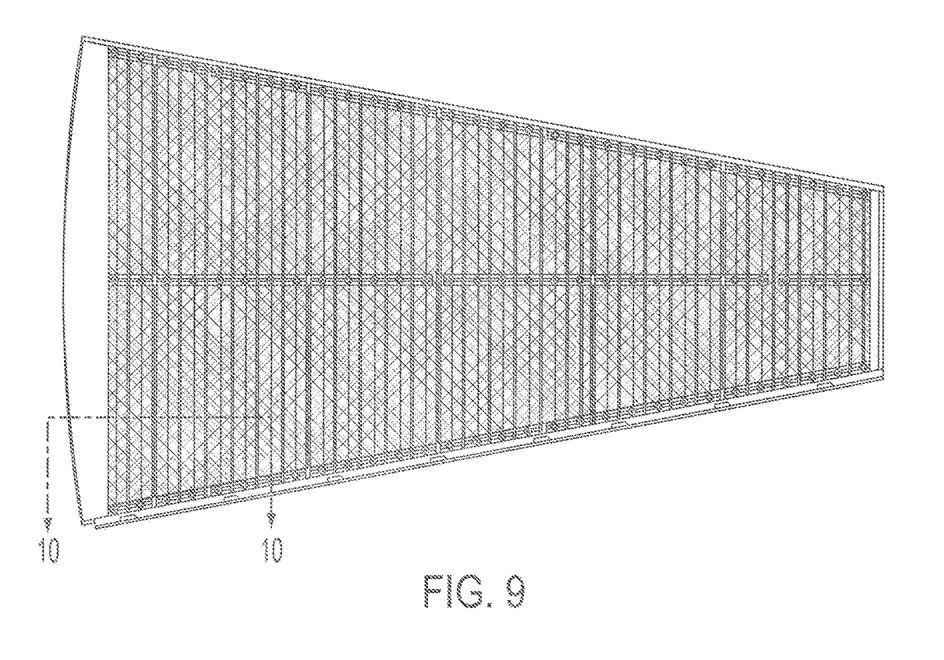
FIG. 9 is a top view of the disc segment of FIG. 2.

In the preferred embodiment, the right side rail 36 comprises a solid rectangular frame (see FIG. 8), and the left side rail 32 comprises an open rectangular frame (see FIGS. 6, 7 and 10) that allows filtrate to pass through the left side rail 32. As shown in FIG. 1, the left side of the disc segment is the drainage side of the disc segment 24.

In the preferred embodiment, the frame is made of plastic, the plastic aiding in the frames providing a lightweight disc segment 24 with ample structural support and rigidity.

Figure 11:
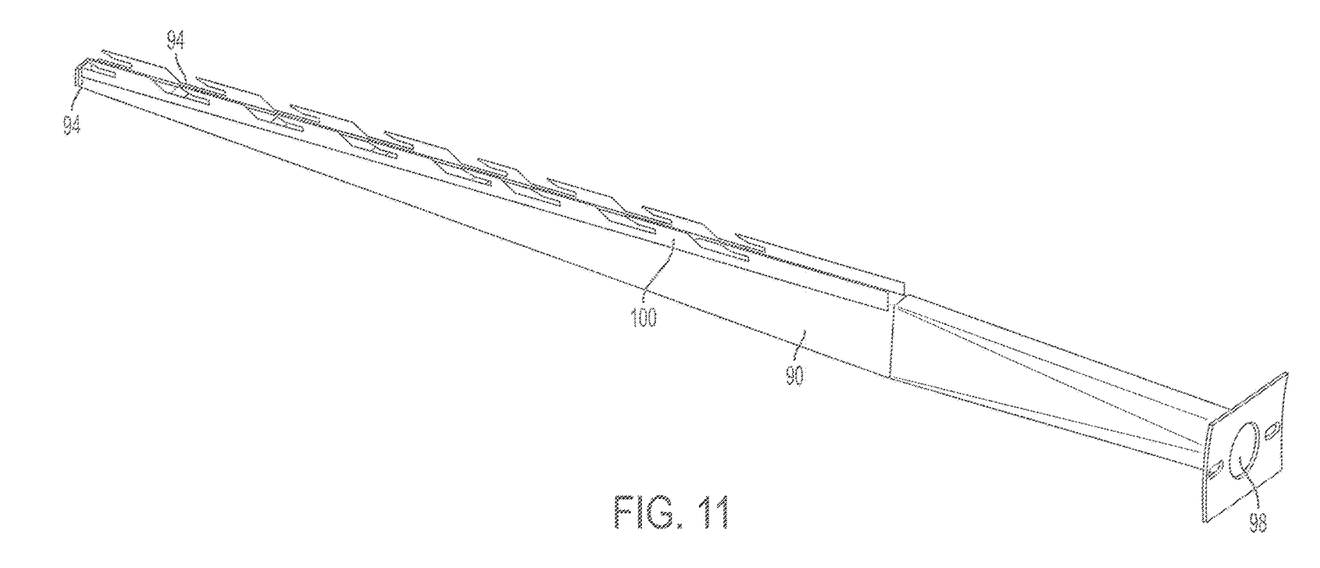
FIG. 11 is a perspective view of a collection tube according to this disclosure.
Figure 12:
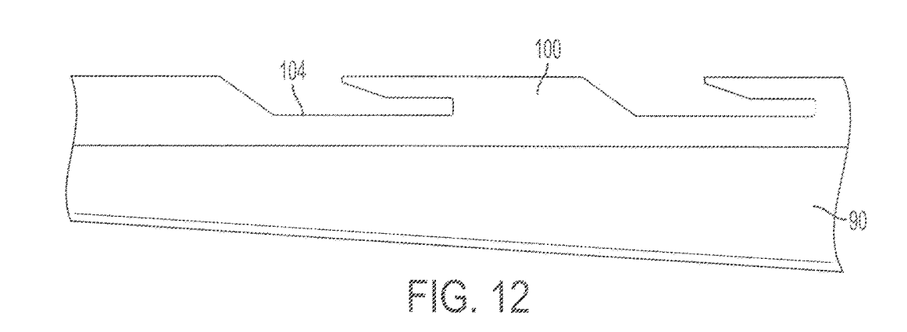
FIG. 12 is a partial enlarged view of a portion of the side of the collection tube.

As illustrated in FIGS. 1 and 11, the disc segment 24 further includes an outlet channel or collection tube 90 attached to the disc segment 24, each respective disc segment outlet channel 90 in turn being attached to the central hub 26. More particularly, the outlet channel 90 is attached to the left side rail 32, and the outlet channel 90 is in the form of an elongated tube. The outlet channel 90 has an open side 94 shaped to mate with the open rectangular frame of the left side rail 32. The outlet channel 90 further has a closed end 94 and an open end 98, and the open end 98 is adapted to be attached to a central hub in a conventional manner so that filtrate can pass through the outlet channel 90 to the central hub 26.

The outlet channel 90 is attached to the left side rail 32 in a manner that facilitates its assembly. More particularly, the outlet channel 90 further includes flanges 100 with slotted openings 104, the flanges 100 extending from the open side 94. The flanges 100 are adapted to extend toward and around the left side rail 32, as explained hereafter. The left side rail 32 includes spaced apart protrusions 108 that extend from the top and bottom of the open rectangular frame and coplanar with the frame, and are spaced so as to be aligned with the flange slotted openings 104, so that the outlet channel 90 can be attached to the left side rail 32 by having the protrusions 108 enter the slotted openings 104, as shown in FIG. 13, then travel along the slotted openings to a flat 110 in the flange 100 at the bottom end of the slotted opening 104, where the outlet channel 90 is then adjacent the left side rail 32, and fixed relative thereto.

Figure 14:
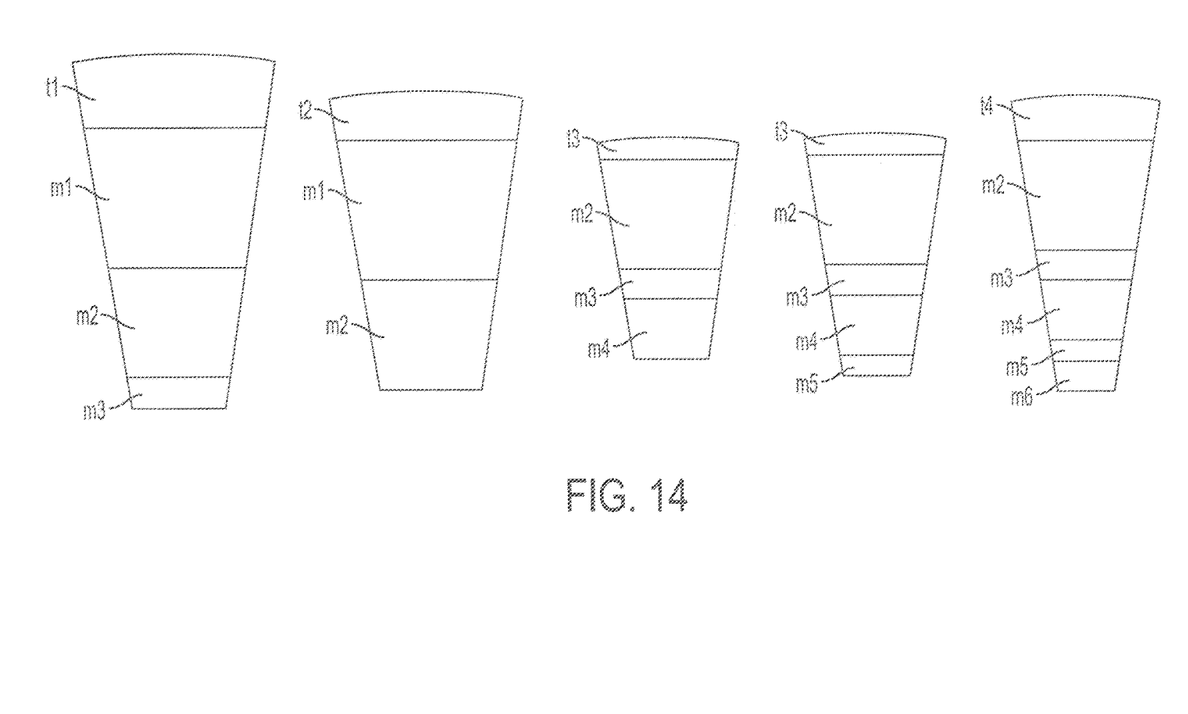
FIG. 14 is a schematic view of a number of different size disc assembles formed from a variety of different frames according to this disclosure.

In order to allow just a few parts to create a variety of frame sizes, and to ease the manufacture of the plastic frames, each disc segment 24 includes a plurality of frames attached to one another, the assembled frames forming an isoceles trapezoid disc segment, as illustrated in FIGS. 2 and 14. The plurality of frames are attached to one another by a dovetail joint (see FIG. 5) by providing the bottom of each frame side rail with a pin 114, and the top of each frame side rail with a tail 118. The frame pin 114 is placed within the tail 118 to attach the frames together. In other embodiments (not shown), the location of the pin and tail can be reversed.

In order to complete the disc segment 24, the disc segment 24 further includes a top 120, and a bottom 124, as illustrated in FIG. 4, each including a elongated member similar to one of the ribs, with the ends extending at an angle to the elongated member, and having thereon a pin or tail for mating with the complimentary structure on the frame side end.

Figure 13:
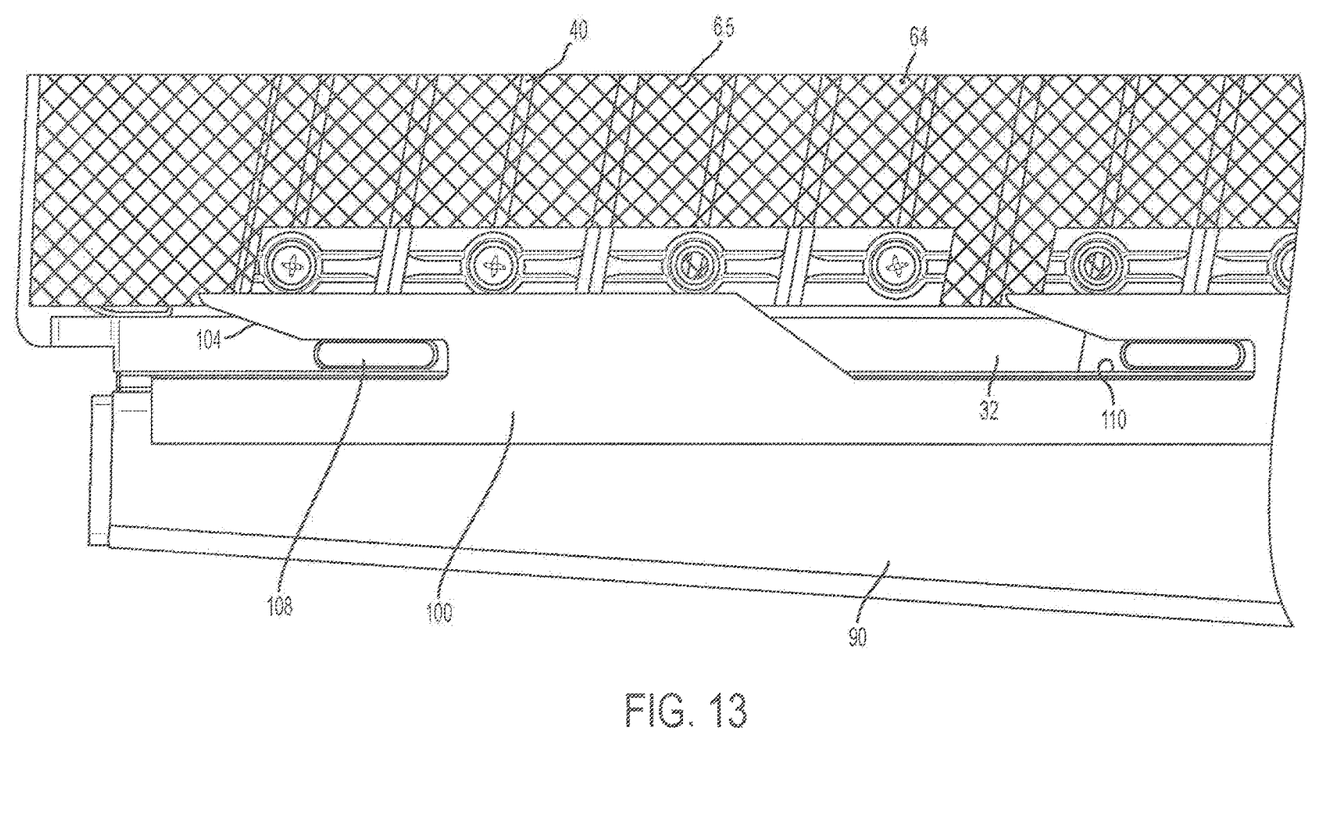
FIG. 13 is a partial enlarged top view of the assembled disc assembly and collection tube.

As best illustrated in FIGS. 3 and 13, the disc segment 24 includes a wire mesh 64 supported by the support ribs 40. The wire mesh includes crisscrossing wire strands 65, the strands 65 crossing perpendicularly to each other. The wire mesh 64 is held on the support ribs 40 such that the individual strands 65 cross the underlying support rib 40 at an angle of 45 degrees. In other embodiments, at least one wire strand 65 can be placed at between a 30 degree and a 60 degree angle relative to the underlying support rib 40.

By having the individual strands 65 overlay the underlying support rib 40 at other than a 90-degree angle, more of each individual strand 65 ends up being supported by the respective support rib 40. This results in the wire mesh 65 flexing less than if the strands 65 were at 90 degrees relative to the underlying support rib 40. This reduces the stress on the wire mesh 64, resulting in a longer disc segment life.

The invention claimed is:

1. A disc segment adapted to be attached to other disc segments to form a disc assembly, the disc segment being in the form of
   a frame, the frame comprising
   a left side rail and a right side rail, and a plurality of spaced apart parallel
   horizontally extending frame ribs, each horizontally extending frame rib being attached to one side rail and then extending over to and being attached to the other side rail, the frame defining a first disc side and an opposite second disc side, with liquid being able to pass between the spaced apart horizontally extending frame ribs from one-disc side to the other disc side, each disc side including
   a corrugated wire mesh supported by the spaced apart parallel horizontally extending frame ribs,
   the corrugated wire mesh including at least one wire strand that extends at an angle of about 45 degrees relative to the horizontally extending frame rib that supports the at least one wire strand.

2. A disc segment adapted to be attached to other disc segments to form a disc assembly, the disc segment being in the form of
   a frame, the frame comprising
   a left side rail and a right side rail, and a plurality of spaced apart parallel horizontally extending frame ribs, each horizontally extending frame rib being attached to one side rail and then extending over to and being attached to the other side rail, the frame defining a first disc side and an opposite second disc side, with liquid being able to pass between the spaced apart horizontally extending frame ribs from one-disc side to the other disc side, each disc side including a corrugated wire mesh supported by the frame ribs, the corrugated wire mesh including crisscrossing wire strands, the crisscrossing wire strands crossing perpendicularly to each other, and the crisscrossing wire strands extend at an angle of about 45 degrees relative to the horizontally extending frame rib that supports the crisscrossing wire strands.

\* \* \* \* \*